United States Patent [19]

Cipolla

[11] Patent Number: 4,572,564
[45] Date of Patent: Feb. 25, 1986

[54] ADAPTIVE GRIPPING DEVICE

[75] Inventor: Thomas M. Cipolla, Ballston Lake, N.Y.

[73] Assignee: General Electric Company, Schenectady, N.Y.

[21] Appl. No.: 630,152

[22] Filed: Jul. 12, 1984

[51] Int. Cl.[4] .............................................. B25J 15/00
[52] U.S. Cl. ...................................... 294/88; 269/32; 269/266; 294/119.1; 294/902; 901/37; 901/39
[58] Field of Search ................... 294/1 R, 86 R, 87 R, 294/88, 99 R, DIG. 2; 269/32, 90, 224, 265–267, 275; 901/30, 31, 36, 37, 39

[56] References Cited

U.S. PATENT DOCUMENTS

| | | | |
|---|---|---|---|
| 2,486,494 | 11/1949 | Rice | 269/266 |
| 2,754,708 | 7/1956 | Peterson | 294/1 R X |
| 3,530,994 | 9/1970 | Bourassa et al. | 269/266 X |
| 3,945,676 | 3/1976 | Asamoto | 294/88 |
| 4,047,709 | 9/1977 | Thyberg et al. | 269/266 X |
| 4,088,312 | 5/1978 | Frosch et al. | 269/266 X |
| 4,185,866 | 1/1980 | Wittwer | 294/88 |
| 4,448,405 | 5/1984 | Cipolla | 269/32 |

FOREIGN PATENT DOCUMENTS

| | | | |
|---|---|---|---|
| 751621 | 7/1980 | U.S.S.R. | 294/86 R |
| 770787 | 10/1980 | U.S.S.R. | 294/DIG. 2 |

Primary Examiner—Johnny D. Cherry
Attorney, Agent, or Firm—Donald R. Campbell; James C. Davis, Jr.; Paul R. Webb, II

[57] ABSTRACT

A versatile robotic gripper is easily and quickly adjusted to grip objects of different geometrical shapes without changing parts and under complete machine control. Opposing jaws have a matrix of axially movable pins each of which is mechanically locked in any axial position. Actuation of an operating mechanism to move the jaws together to grasp an object depresses the pins and they collectively conform to the shape of the object; the jaws retain this shape upon release of the object. A plate is raised to unlock the pins which are returned by springs to a fixed coplanar position.

6 Claims, 8 Drawing Figures

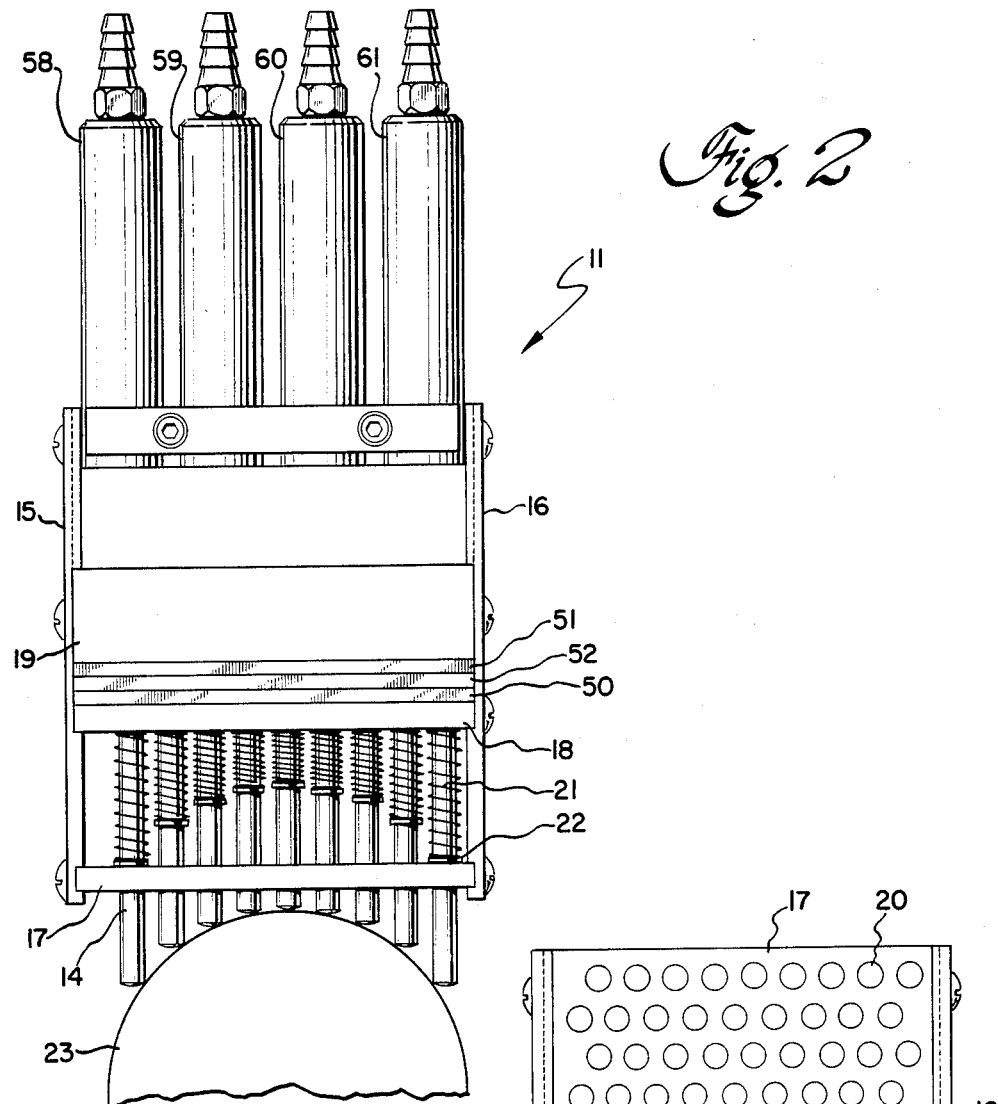
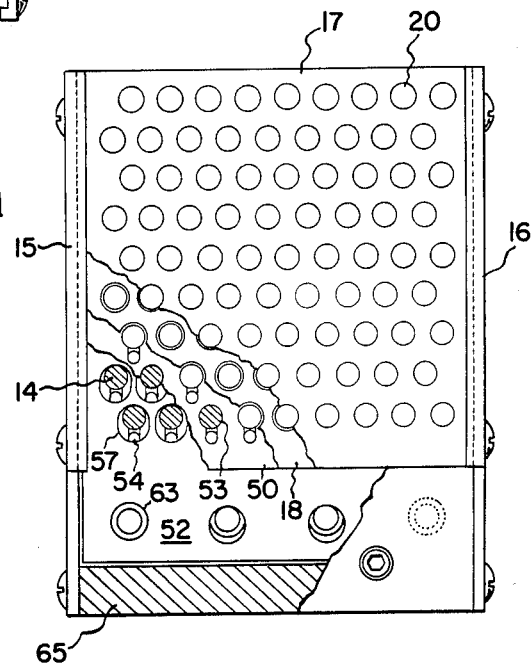

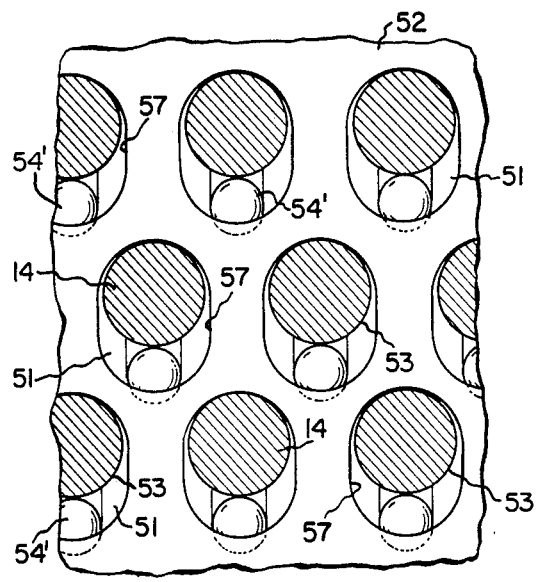
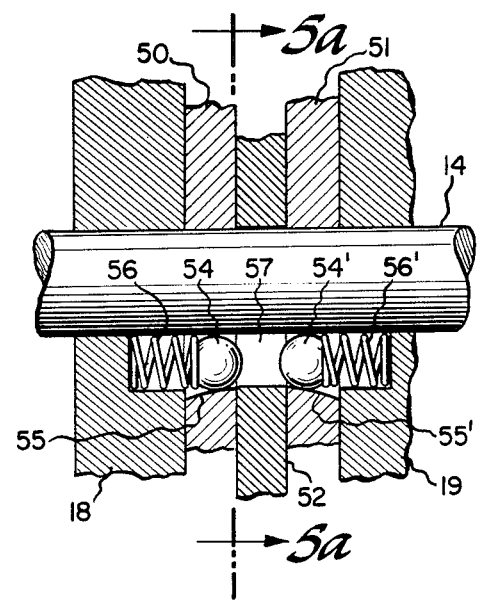
Fig. 5a
Fig. 5b
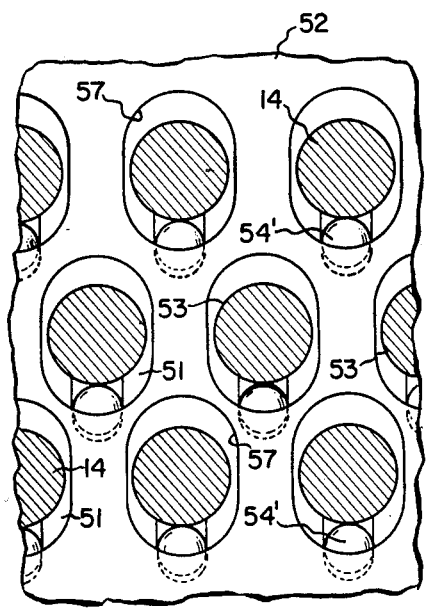
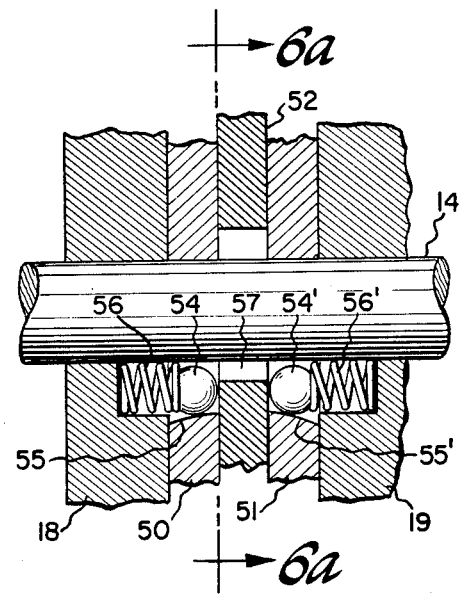
Fig. 6a
Fig. 6b

ADAPTIVE GRIPPING DEVICE

BACKGROUND OF THE INVENTION

This invention relates to a versatile gripper for an industrial robot that can also be used as a stand alone device for fixturing parts in the process of manufacturing, transporting, assembly, or inspection.

In recent years the use of robots have shown large productivity increases and is expected to continue to do so at an accelerating rate in the forseeable future. The major applications for industrial robots today are for welding, painting, and simple parts transferring. However, the greatest potential for gains in productivity lies in the areas of assembly, inspection and complex material handling. The large majority of these productivity increases have not been tapped because these tasks require versatile and/or programmable end effectors. The current technology allows programmable motion but does not allow programmable grasping of objects with accurate and predictable stable states of the objects to be grasped relative to the gripping device. The greatest productivity gains by industrial robots will not be realized without fundamental advances in end effector technology.

SUMMARY OF THE INVENTION

A feature of this adaptive gripping device is that it grips objects in a predictable, stable and repeatable manner.

Another feature of this device is that it can be easily and quickly adjusted to grip many different objects of different geometrical shapes without changing any parts on the device.

Yet another feature is that it is possible to ajdust this device to accommodate various part shapes without human intervention and under complete machine control.

A further feature of this device is that once it is adjusted to a particular part shape it retains that adjustment without any power source actively applied to it; if the same part is gripped many times or if many objects of identical shape are gripped sequentially, no adjustment to the device is necessary.

The adaptive gripping device is comprised of two opposing jaw assemblies and a power actuated operating mechanism to move the jaws linearly to grasp and release an object. Each jaw assembly has a matrix of axially movable gripper pins, such as a nine by nine array in alternately staggered rows. Means are provided for mechanically locking the individual pins in any position within its range of motion. With the pins unlocked, they are spring biased to a fixed position with their ends coplanar. When an object to be grasped is placed between the jaws, the jaw operating mechanism is actuated causing both jaws to move toward the object. Continuation of this inward movement causes some pins to contact the object and collectively conform to the shape of the object and be locked. The jaws are then released and because the pins are locked, they retain the shape of the object. Each jaw has means operated by power cylinders for unlocking all the pins which are returned by springs to the fixed position.

The operating mechanism may be that in the inventor's U.S. Pat. No. 4,448,405 or any other which imparts opposing straight line motion to the jaws.

BRIEF DESCRIPTION OF THE DRAWINGS

FIG. 2 is a top view of one jaw assembly.

FIG. 3 is a front elevation view of the jaw assembly with plates broken away to illustrate interior detail.

FIGS. 5a and 5b are partial cross sectional views showing the pin locking mechanism in locked position.

FIGS. 6a and 6b are similar views of the pin locking mechanism in unlocked position.

DETAILED DESCRIPTION OF THE INVENTION

Figure 1:
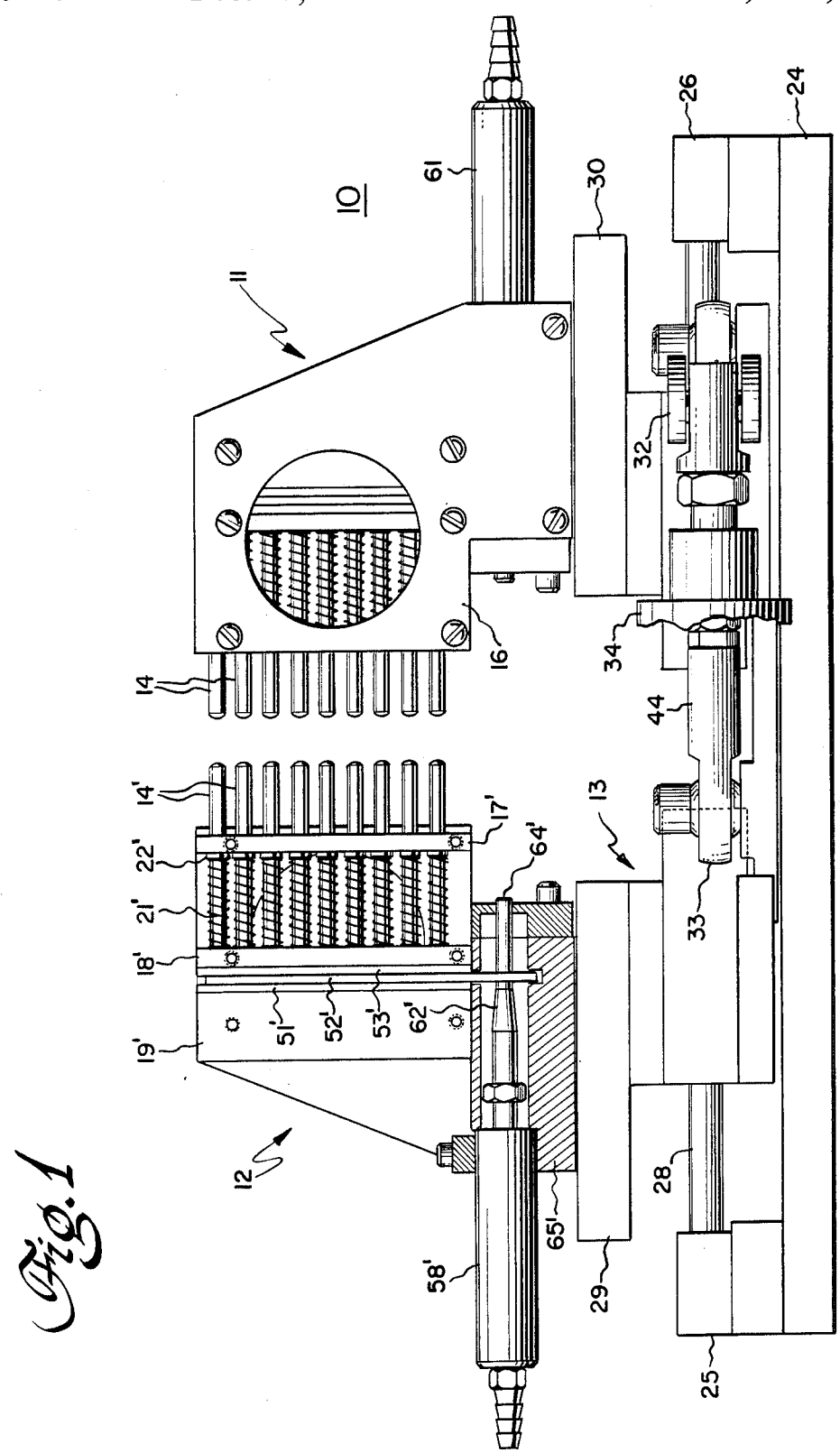
FIG. 1 is an overall side elevational view and partial cross section of the jaw assemblies and operating mechanism.

In FIG. 1, the improved gripping device 10 consists of two opposing, usually identical jaw assemblies 11 and 12 and a pneumatically actuated operating mechanism 13 that allows the jaws to be moved relative to each other with opposing, linear motion. Referring also to FIGS. 2 and 3, each jaw has a matrix of axially movable gripper pins 14 each of which can be mechanically locked in any infinitesimally varying position within its range of motion. For the device shown, each jaw has 81 pins in a nine by nine square array with alternately staggered rows. Pin diameters are 0.125 inches with 0.200 inch spacing between rows and columns. The device could be built with greater or fewer pins with different spacing configurations and larger or smaller diameter pins.

The frame of jaw assembly 11 is comprised of side plates 15 and 16 between which are fastened a front plate 17 and, farther back, parallel thrust plates 18 and 19. Gripper pins 14 pass through the staggered rows of holes 20 in plates 17 and 18. With the pins 14 in the unlocked position, each pin will move axially away from plate 18 and its supporting mechanism, toward the opposite jaw, via a spring 21 and come to rest in a fixed position determined by a mechanical stop consisting of a small pin 22 pressed into a cross drilled hole in the gripper pin. Because all of the cross drilled holes are equidistant from the ends of the gripper pins 14, the fixed position is such that the ends of all gripper pins on a particular jaw are coplanar as shown in FIG. 1. In this figure, the same components in jaw assembly 12 are identified by corresponding primed numerals.

When an object to be grasped is placed between jaws 11 and 12, the jaw operating mechanism 13 is activated causing both jaws to move toward the object. As each individual pin 14 contacts the object to be grasped, its absolute motion stops. With the continued motion of the jaws, several pins 14 are depressed and contact the object, thus collectively conforming to the shape of the object. The pins 14 can then be mechanically locked into each individual axial position by a mechanism described in more detail later. The object is now stably and rigidly grasped by the two opposing jaws that conform to the shape of the object and exert opposing forces on the object via the jaw operating mechanism 13. Jaws 11 and 12 can then be released from the object and, because the pins are locked, the jaws will retain the shape of the object. An example of a cylindrical object 23 is shown in FIG. 2. With gripper pins 14 locked, the same object or an identical object can be regrasped without changing the configuration of the pins. Tests have shown that regrasping an object is repeatable within 0.001 inches.

Figure 4:
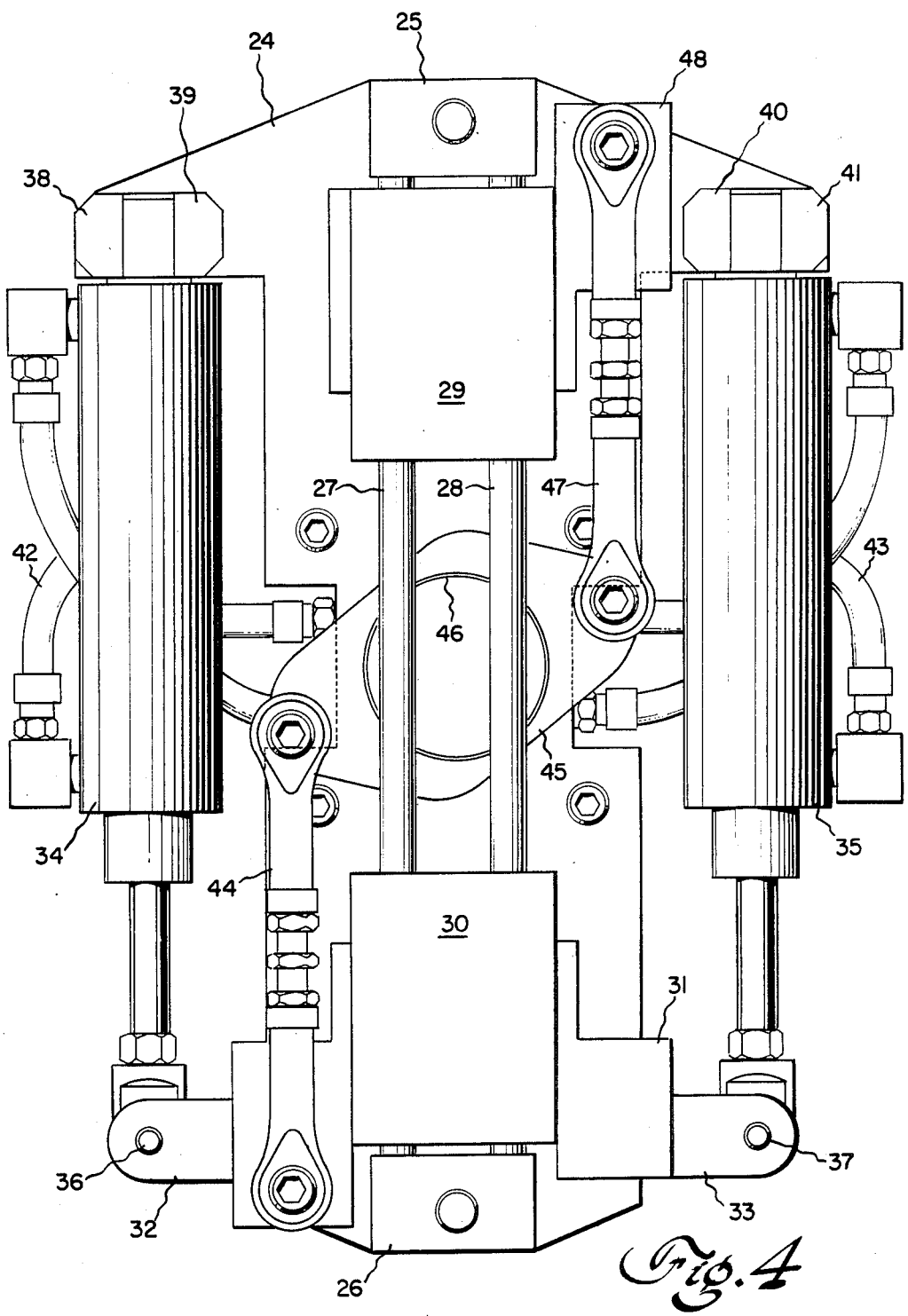
FIG. 4 is a plan view of the operating mechanism.

The jaw operating mechanism 13 illustrated in FIGS. 1 and 4 is described in greater detail in U.S. Pat. No. 4,448,405, the disclosure of which is incorporated herein by reference. The particular operating mechanism used with the pair of jaws is not relevant to this invention. Any mechanism that allows opposing linear relative motion of the jaws can be used. The one illustrated has a base plate 24 to which are fastened blocks 25 and 26 which hold two parallel rods 27 and 28. On these rods are mounted two slide blocks 29 and 30 which are fitted with linear ball bearings that allow them to slide axially along the rods. An arm 31 is attached to the lower surface of slide 30 and has two clevises 32 and 33 which are an integral part of the arm. The movable parts of pneumatic cylinders 34 and 35 are attached to clevises 32 and 33 by means of pins 36 and 37, and the stationary parts of the power cylinders are mounted to base plate 24 through trunnion blocks 38–41. Pressurized air supplied through hoses 42 and 43 operates the pneumatic cylinders 34 and 35 thus causing linear motion of the slides along rods 27 and 28. Alternatively, the power sources may be hydraulic cylinders.

A connecting rod assembly 44 has one end fastened to arm 31 and the other end pivoted to a crank 45 which is in turn pivotally attached to base plate 24 through a bearing 46. A second connecting rod assembly 47 is also pivoted to the crank 45 and is fastened at the other end to an arm 48 which is attached to slide block 29. Slides 29 and 30, connecting rods 44 and 47, and crank 45 form a double crank and slider mechanism which, when the pneumatic cylinders are actuated, causes the two slides 29 and 30 to move axially along rods 27 and 28 but in opposite directions. Thus, operating the pneumatic cylinders causes linear motion of slide 30 and an equal and opposite linear motion of slide 29. This motion of the slide blocks, on which the gripper jaw assemblies 11 and 12 are mounted, provides the straight line motion necessary for engaging and disengaging the jaws on the object to be grasped.

FIGS. 5a and 5b are partial cross section views showing the pin locking mechanism in the locked position. Each gripper pin 14 passes through several plates that are stacked relative to each other. The two thrust plates 18 and 19 are fastened to the two side plates 15 and 16 (FIG. 2) to keep them a fixed distance from each other. Between them are stationary locking plates 50 and 51 and a movable stripper plate 52 which is down in the locked position of the jaws and up in the unlocked position. The locking and unlocking mechanism depicted in FIG. 5b is provided for every gripper pin. FIG. 5a shows stripper plate 52 and locking plate 51 and the cross section is taken at the line 5a—5a shown in FIG. 5b. Locking plates 50 and 51 contain a matrix of keyhole-shaped holes 53. The large diameter portion of each keyhole-shaped hole allows clearance for the hardened steel pin 14 to pass through it and the smaller diameter portion allows clearance for a hardened steel ball 54 or 54'. The smaller diameter of hole 53 has an angled surface 55 to allow the ball 54 to wedge between this angle and the pin 14 when an axial force is applied to the pin. A spring 56 is recessed in the thrust plate 18 to insure that the locking ball 54 will be pressed between the pin and the angled surface. The forces on the ball are such that if an axial force is applied to pin 14 in the uphill direction of the wedge, a force will be transmitted through ball 54 to pin 14 in the radial direction of the pin larger than what is necessary to hold the pin in place by friction. The amount of force transmitted to the pin is controlled by the angle of the wedge. Because this locking scheme locks the pin in one direction only, there are two such locking mechanisms for each pin, each operating in opposing directions. The second mechanism is operative when the gripping device 10 is opened and causes the array of pins 14 to stay in the same place and not lose the object shape. Angled surface 55' in the keyhole-shaped hole in locking plate 51 is oppositely sloped. An axial force tending to move pin 14 to the left in FIG. 5b causes ball 54', acted on by spring 56', to wedge and lock the pin.

The location of the angled portion 55 of locking plate 50 is such that, when ball 54 is pushed into the locked position by spring 56, the ball protrudes from the angle chamber and into a clearance portion of stripper plate 52 by, say, 0.003 to 0.008 inches. The clearance portion is an elongated slot 57; stripper plate 52 has an array of such slots, one for each pin. Similarly, locking balls 54' protrude into these slots if the pins are locked from the other direction. When stripper plate 52 is pushed up by an actuating mechanism, the edges of the stripper plate clearance slots 57 contact the balls in such a way that they push the balls out of the wedge and the balls cannot contact the pins and the angled portions of the ball chambers at the same time thus unlocking the pins. The unlocked position of the pin locking mechanism is illustrated in FIGS. 6a and 6b; the former is taken on line 6a—6a of the latter.

FIG. 1 shows a cross section view of the stripper plate operating mechanism. The mechanism to raise and lower the stripper plate 52' is comprised of four coplanar pneumatic cylinders 58'–61' (FIG. 2) to each of which is attached a cylindrical operating cam 62'. Alternatively, these cylinders may be hydraulic. The length of the tapered portion of the cams is equal to the length of the stroke of the pneumatic cylinders, and the difference between the maximum and minimum radii is equal to the motion stroke of the stripper plate. Each of the cams 62' passes through a hole 63 (see FIG. 3) in the stripper plate with a diameter equal to the maximum diameter of the cam pin. The centerlines of the two outside holes 63 in the stripper plate 52 or 52' are concentric with the two outside cam rods 64' when the stripper plate is in the down position, and the centerlines of the two inside holes 63 in the stripper plate are concentric with the two inside cam rods 64' when the stripper plate is in the up position. Thus, when the two outside pneumatic cylinders push the cam rod 64' forward, the edges of the holes 63 in the stripper plate ride on the tapered portion 62' of the cam rod forcing the stripper plate downward. With the outside cam rods 64' retracted in a like manner, the inside cam rods can be pushed forward to raise the stripper plate 52 or 52'. This unlocks all the gripper pins 14' which move forward and are returned by springs 21' to the fixed position with their ends coplanar. The base of jaw assembly 12 is indicated generally at 65' and is mounted on slide 29.

This adaptive gripping device stably and rigidly grips objects in a predictable and repeatable manner, grasps objects of different geometrical shapes without changing parts on the gripper, and does this under complete machine control. The device retains a particular part shape without any power source actively applied to it. No adjustment is needed to grip the same part many times or to grip sequentially many objects of identical shape.

While the invention has been particularly shown and described with reference to a preferred embodiment thereof, it will be understood by those skilled in the art and the foregoing andd other changes in form and details may be made without departing from the spirit and scope of the invention.

What is claimed is:

1. An adaptive gripping device for industrial robots and fixturing parts comprising:

two substantially identical opposing jaw assemblies both having a matrix of axially movable gripper pins and means for biasing said pins to a fixed position;

an operating mechanism on which said jaw assemblies are mounted to have opposing linear relative motion to grasp and release an object, and means for activating said operating mechanism to slide said jaw assemblies together causing individual pins to contact the object and be depressed and collectively conform to the shape of the object;

each jaw assembly including pin locking means comprised of two locking mechanisms for each pin operating in opposite directions that mechanically lock the pin in any position within its range of motion when an axial force is applied to the pin, whereby said jaw assemblies retain the object shape after release of said object, and pin unlocking means actuated by power means for unlocking all of said pins which are returned by said biasing means to said fixed position.

2. An adaptive gripping device for industrial robots and fixturing parts comprising:

two opposing jaw assemblies each having a matrix of axially movable gripper pins, and means for mechanically locking each pin in any position within its range of motion;

an operating mechanism on which said jaw assemblies are mounted to have opposing linear relative motion to grasp and release an object, inward movement causing individual pins to contact the object and collectively conform to the shape of the object;

each jaw assembly further including means for unlocking and returning all of said gripper pins to a fixed position;

said pin locking means comprising identical locking mechanisms that operate in opposite directions, whereby said jaw assemblies retain the object shape after its release, and each locking mechanism is comprised of a locking plate having a keyhole-shaped hole, said gripper pin and a locking ball being received in larger and smaller portions of said keyhole-shaped hole and the latter having an angled surface, and spring means to press said ball between said pin and angled surface which form a wedge, whereby said pin is locked when an axial force is applied thereto in the uphill direction of the wedge.

3. The gripping device of claim 2 wherein said pin unlocking means is comprised of a stripper plate having a slot into which said ball protrudes in locked position, and means for moving said stripper plate and causing the edge of said slot to push each ball out of the wedge and unlock said pins.

4. The gripping device of claim 3 wherein said operating mechanism and both jaw assemblies are powered by pneumatic or hydraulic cylinders.

5. An adaptive gripping device for industrial robots and fixturing parts comprising:

two identical opposing jaw assemblies each having a square array of axially movable gripper pins, means for biasing said pins to a fixed position with their ends coplanar, and means for mechanically locking each pin in any position within its range of motion in either direction;

an operating mechanism on which said jaw assemblies are mounted to have opposing linear relative motion to grasp and release an object, means for activating said operating mechanism to slide said jaw assemblies toward each other causing individual pins to contact the object and be depressed and collectively conform to the shape of the object and retain this shape after its release;

each jaw assembly further including pin unlocking means actuated by power cylinders, said biasing means returning said pins to said fixed position;

said pin locking and unlocking means being comprised of two locking plates having keyhole-shaped holes and a stripper plate having an elongated slot, said gripper pin passing through larger diameter portions of said keyhole-shaped holes and through said slot, a locking ball received in a smaller diameter portion of each hole which has an angled surface, spring means to press each ball between a wedge formed by said angled surface and pin, whereby said pin is locked when an axial force is applied in the uphill direction of the respective wedge, each ball protuding into said slot in locked position, and means for moving said stripper plate so that the edge of said slot pushes each ball out of the respective wedge and unlocks said pin.

6. The gripping device of claim 5 wherein the last-mentioned means comprises pneumatic or hydraulic cylinders that operate cams which engage the edges of holes in said stripper plate and raise and lower said stripper plate.

* * * * *